June 27, 1944.   E. W. MILLER   2,352,557
GEAR FINISHING APPARATUS
Filed Sept. 12, 1939   3 Sheets-Sheet 1

Inventor
Edward W. Miller

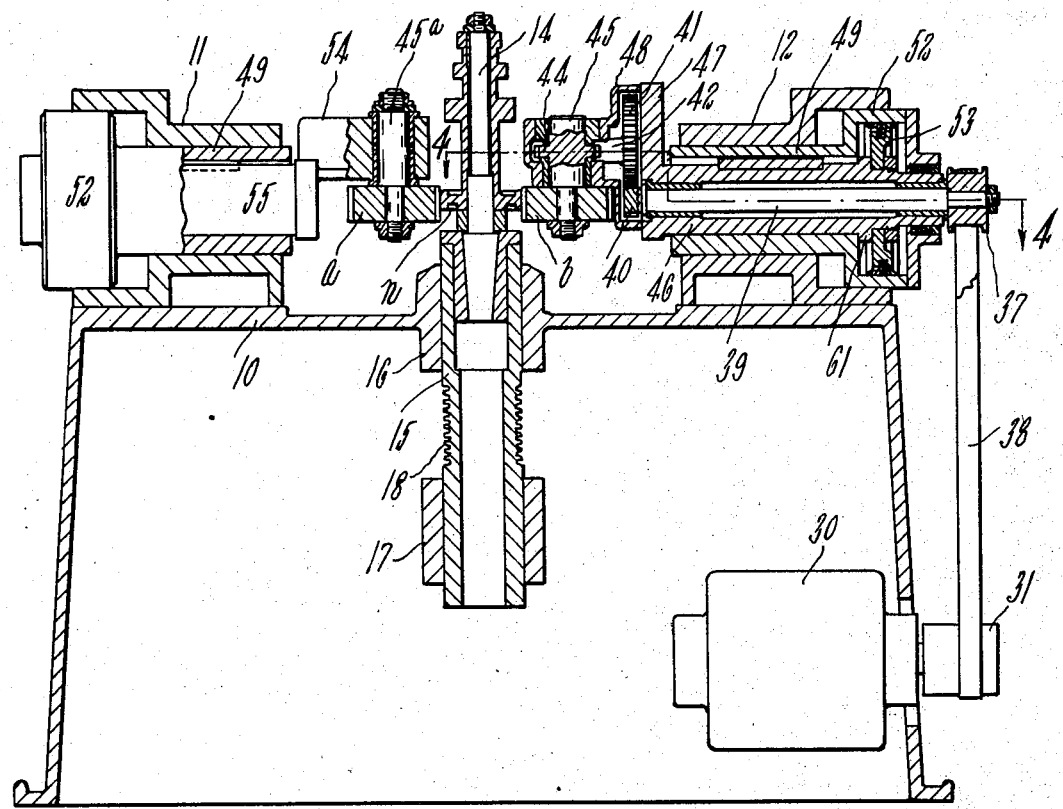
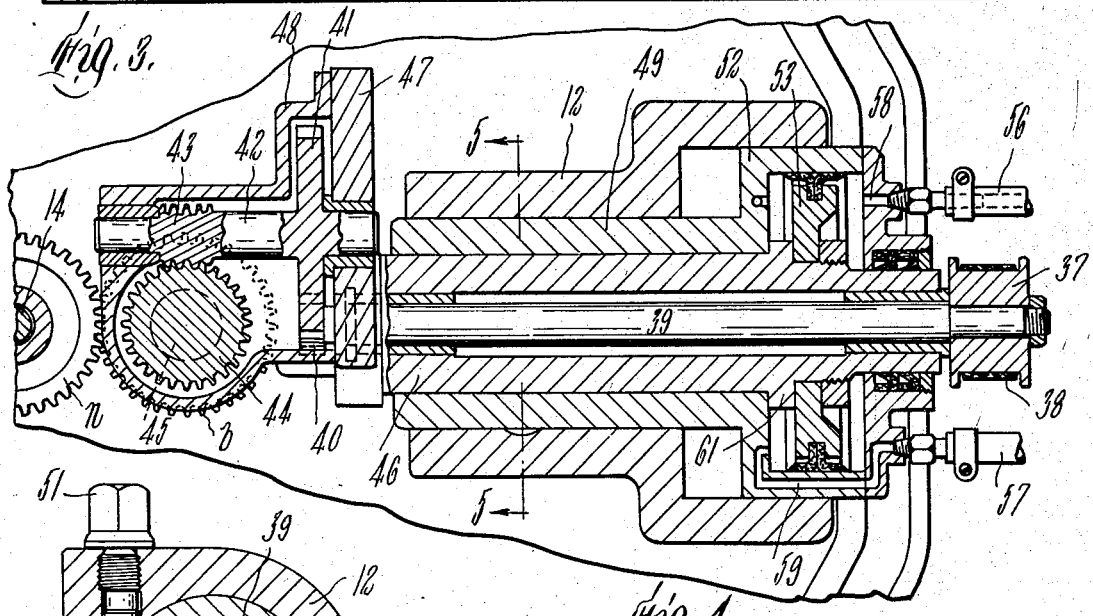
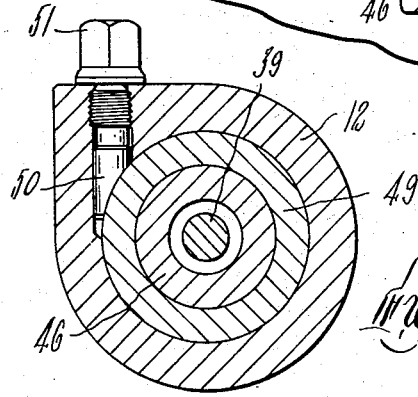

June 27, 1944.  E. W. MILLER  2,352,557
GEAR FINISHING APPARATUS
Filed Sept. 12, 1939  3 Sheets-Sheet 3
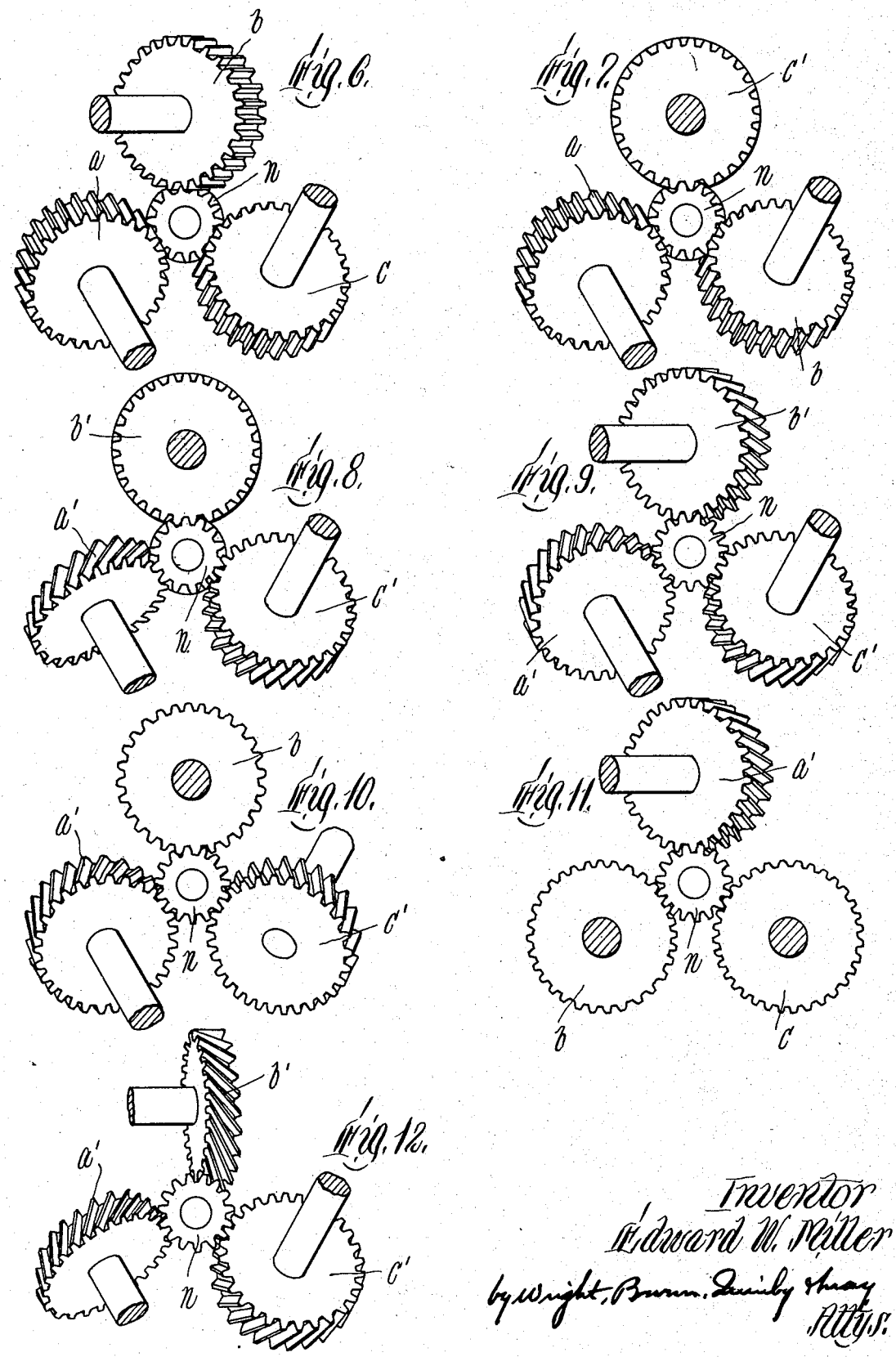

Patented June 27, 1944

2,352,557

UNITED STATES PATENT OFFICE 2,352,557

GEAR FINISHING APPARATUS

Edward W. Miller, Springfield, Vt., assignor to
The Fellows Gear Shaper Company, Springfield,
Vt., a corporation of Vermont Application September 12, 1939, Serial No. 294,463

17 Claims. (Cl. 90—1.6)

The present invention relates to the art of finishing gears to a condition of extreme accuracy of tooth form and dimensions after having been cut to a more or less close approximation of such finished condition. More particularly it relates to finishing gears by either shaving, lapping or burnishing. In each of these methods of operation, tools are used which are essentially like gears in that they have teeth adapted to mesh with the gear to be finished and are conjugate to the tooth forms prescribed for the finished gear. They are made with extreme accuracy as to dimensions and tooth curvature, of metals, alloys or compositions possessing hardness or other qualities enabling them to affect the shape of the work gear either by removing metal from the tooth faces thereof or by deforming such tooth faces by pressure. Shaving tools for this purpose are distinguished from tools of the other categories here referred to in that their teeth are interrupted by clearance spaces, the bounding walls of which intersect the side faces of the teeth and form cutting edges at such intersections. Such tools may be made of a single solid piece with grooves or gashes cut in their sides or all the way through them, or they may be of laminated construction in which the several units have teeth with cutting edges at one or both ends and are assembled in an alinement (straight or helical) corresponding to the tooth length of the work piece. Tools for finishing gears by lapping are used with a loose abrasive or lapping compound which is introduced between their teeth and the teeth of the work piece in the finishing operation. Burnishing tools have smooth tooth faces of greater hardness than the material of which the work pieces are made. Grinding wheels or hones having the same gear formation may likewise be used for finishing gears by abrasion.

The object of the invention is to provide a machine adapted to hold a number of such tools simultaneously in mesh with the same work piece and having means for effecting rotation of the work piece and tools in mesh with one another, exerting a radial pressure between the tools and work piece, and effecting a relative reciprocation between tools and work piece in the direction of the axis of the latter. A further object is to provide for flexibility of adjustment whereby tools of spur gear character may be run in mesh with a helical work gear, and vice versa; tools of both spur and helical character may be meshed simultaneously with the same work piece, whether the work piece is a spur gear or a helical gear, and helical gear tools of respectively different helix angles may be meshed with the same work gear, whether such gear is spur or helical.

The invention comprises a machine having the characteristics and capacities above outlined. It further comprises machine combinations of supporting means and tools of various characteristics in association for operation on the same work piece.

The present application is a continuation-in-part of the application filed by me January 26, 1932, Serial No. 588,913, entitled Gear finishing apparatus, on which Letters Patent No. 2,207,438 were issued July 9, 1940.

In the drawings illustrating the invention herein described—

Fig. 3 is a sectional view taken on line 3—3 of Fig. 1;

Fig. 4 is a detail sectional view taken on line 4—4 of Fig. 3;

Fig. 5 is a detail cross section taken on line 5—5 of Fig. 4;

Figure 1:
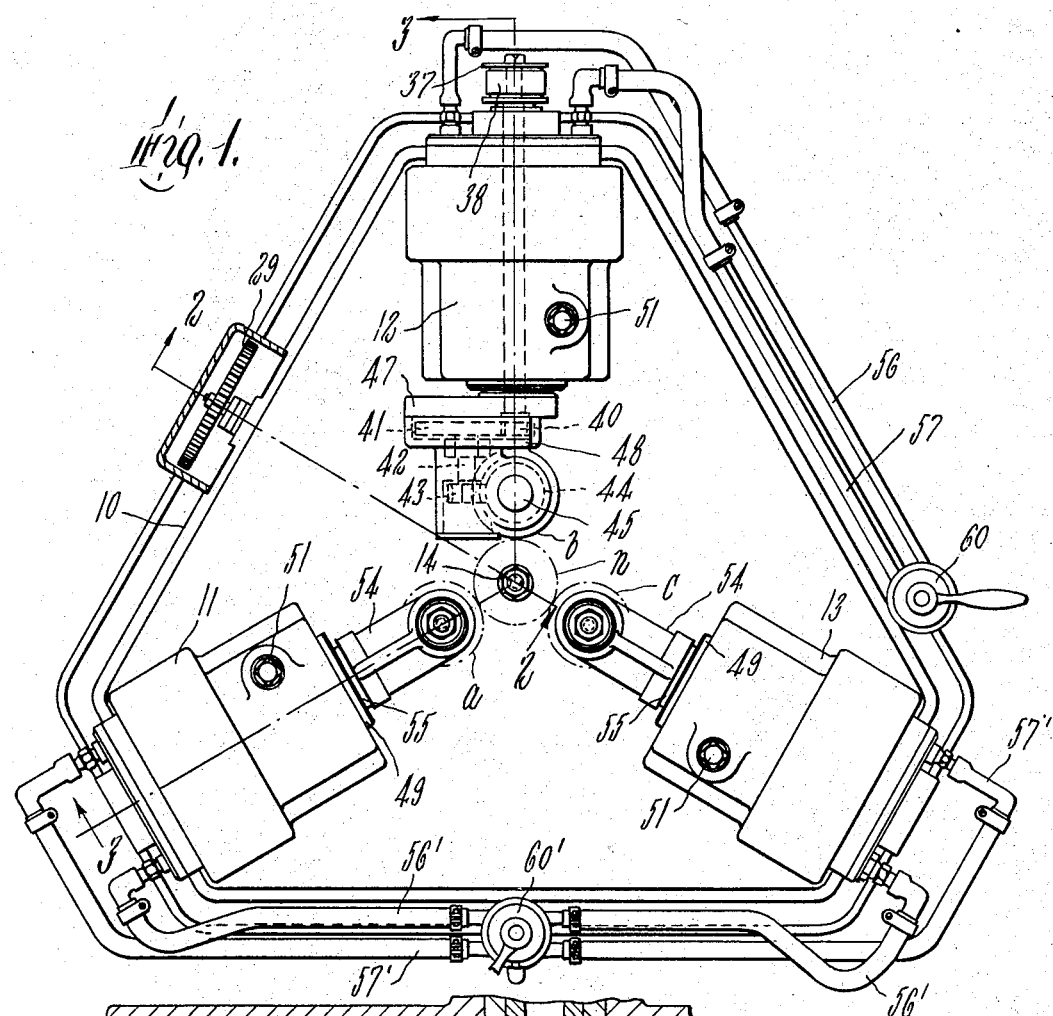
Fig. 1 is a plan view of a gear finishing machine having means for supporting and operating three finishing tools in mesh with the same work gear.

Figs. 6–12 inclusive are diagrammatic plan views of different combinations of finishing tools in their operative relationship as mounted on the tool spindles of the machine and in mesh with a work gear.

Like reference characters designate the same parts wherever they occur in all the figures.

The form of machine embodying the invention shown in these drawings comprises a base 10 of any suitable construction on which are mounted three stationary housings or guides 11, 12 and 13 arranged around a central point and having guiding portions substantially radial to such central point. A work arbor 14 is located with its axis passing through such central point transversely to the housings or guides. In this illustration the arbor is vertical and the guides are horizontal with their median lines all in the same horizontal plane.

A tubular spindle 15 is mounted rotatably and with provision for endwise movement in alined bearings 16 and 17 supported rigidly by the base, and located so that the axis of the spindle coincides with the above described location of the axis of the arbor 14. The arbor is mounted and secured in any suitable manner in the upper end of the spindle and projects therefrom. The one here shown is designed to carry as the work piece the intermediate gear assemblage of an automobile transmission mechanism and hold the element n of the assemblage, which typifies any work piece, in position for simultaneous engagement with the tools.

Figure 2:
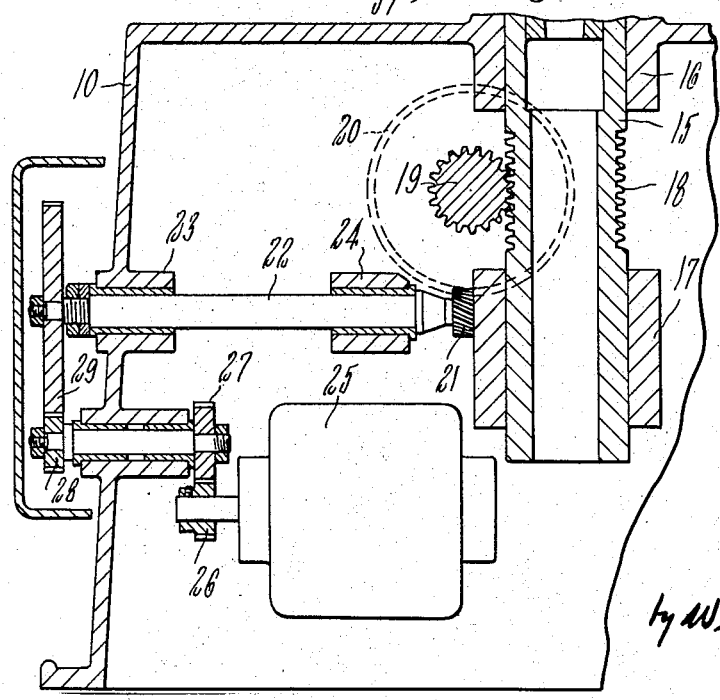
Fig. 2 is a sectional view taken on line 2—2 of Fig. 1.

Spindle 15 is provided with encircling teeth 18 equally spaced apart which mesh with a pinion 19 (Fig. 2). The latter is connected with a helical gear 20 in mesh with a helical pinion 21 on a shaft 22 which is supported in fixed bearings 23 and 24 and is driven at need by a reversible motor 25 through a train of reducing gears 26, 27, 28 and 29, substantially as shown in the drawings. The work piece may thus be reciprocated at a speed determined by the motor speed and the reduction of the gear train, or it may be held stationary at any height within the range of endwise movement of the spindle; and the encircling rack teeth permit the spindle to rotate at the same time.

The three tools here shown are designated a, b and c. One of them, the tool b, is positively driven and drives the work, while the other tools are driven by the work. This driving tool is actuated from an electric motor 30 through pulleys 31, 37 and belt 38, a shaft 39 on which pulley 37 is keyed, a pinion 40 on said shaft, a gear 41 in mesh with pinion 40 and secured to a shaft 42 which is parallel with shaft 39, a throated helical gear 43 on shaft 42, and a helical gear 44 meshing with the gear 43 and secured to a spindle 45 to which the tool b is connected.

Shaft 39 rotates in bearings in a quill or tubular slide 46 having a lateral arm 47 to which is secured a housing 48. Such arm and housing together constitute a bracket in which is contained the gear train 40—44 and in which also are provided the bearings for shaft 42 and tool spindle 45. These bearings are suitably arranged to hold the tool spindle with its axis intersecting and perpendicular to the axis of shaft 39, and with the portion on which the tool is mounted in diametral alinement with the axis of the shaft.

The quill or slide 46 is adapted to slide endwise in a sleeve 49, within which it is keyed or splined so that it cannot rotate independently. The sleeve in turn is adjustable both longitudinally and angularly in the fixed guide 12, having an external cylindrical surface coaxial with shaft 39 fitting a complemental surface in the guide. A wedge 50 (Fig. 5) is mounted in the fixed guide in a passage which intersects the inner surface of the latter and is acted on by a screw 51 so as to clamp the sleeve in any position. Thus the tool b may be adjusted in and out with respect to the axis of the work piece and may also be inclined at any skew angle with respect to the work piece. In being thus inclined, it is turned about the diameter which coincides with the axis of the driving shaft 39.

In this machine the tool b is likewise forced against the work piece and fed to the limited depth prescribed for the finishing operation, by fluid pressure, hydraulic or pneumatic. The outer end of the sleeve 49 is enlarged and made as a cylinder 52 in which is fitted a piston 53 secured to the slide or quill 46. Pressure fluid is conducted by a pipe 56 and port 58 into the outer end of the cylinder for forcing the tool against the work; and through a pipe 57 and passage 59 to the inner end of the cylinder when necessary to retract the tool prior to removing and changing the work piece. A reversing valve 60 is coupled to the pipes 56 and 57 for directing the pressure fluid into either pipe and permitting its release simultaneously from the other pipe. Movement of the slide under pressure toward the work is limited by suitable stop means, such as the shoulder 61 shown in Fig. 4. The limit established by such stop means may be varied by shifting the sleeve 49 with its attached cylinder endwise in the guideway 12, in accordance with the prescribed finished dimensions of the particular gear being worked upon. Once these slides have been properly adjusted for a given work piece, the tool may be thereafter retracted and fed to depth for all duplicate work pieces without readjustment. The fluid pressure system provided here in shown in a diagrammatic way in Fig. 1. The valve 60 may be of any design suitable for the purpose, the principles of which are well known, and suitable valves are available on the market. Therefore, and because I have not made any novel invention in regard to such a valve, I have shown it only diagrammatically.

The other tools here shown are similarly mounted and operated for adjustment and depth feed. Each is secured to a spindle 45a rotatably mounted in an angular bracket 54 which extends from a slide 55, like the slide 46 except that it may be a solid bar or rod, which is equipped with a piston like the piston 53, and fits in a duplicate of the sleeve 49 and hydraulic cylinder 52. The relationship of each of the tools a and c and its spindle 45a to the axis of its slide 55 is substantially identical with that heretofore described with respect to the tool b, spindle 45 and slide 46. Each tool spindle is angularly adjustable independently of the others to any angle between parallelism with the work spindle axis and position in a plane perpendicular to such axis. A similar fluid distribution system to that described in connection with the tool b, consisting of the pipes 56' and 57' and control valve 60' is provided for advancing and retracting the tools a and c and feeding them to a prescribed depth.

Although the valves 60 and 60' are here shown as being adapted for manual operation, it will be understood that automatic means may be provided for operating them within the scope of this invention.

In operation of the machine, the tool carrying sleeves 49 are first adjusted to bring the axes of the several tools at inclinations to the axis of the work determined by the helix angles of their teeth and the work piece teeth and to set the limits of inward movement of the tools at such points as will result in reducing the teeth of the work gear to a prescribed thickness. A gear to be finished is connected with the work spindle and the tools are brought into mesh with it and pressure is applied to the tools forcing them against such gear. The tool b is driven rotatively by the mechanism described, thereby rotating the work piece and the other tools; and the work spindle is slowly reciprocated in the axial direction by the reversing motor 25 so as to distribute the cutting and/or burnishing effect over the entire length of the teeth of the work piece.

The capacity for angular adjustment of the sleeves 49 enables spur gear type tools, or helical gear type tools of any helix angles to be run in mesh with spur gears or helical gears of any helix angle. And the radial adjustment of the tool holding sleeves not only permits gears of different diameters to be finished, but also enables tools of different pitch circle diameters or base circle diameters to be used in finishing different gears or simultaneously in connection with the same gear. The means and provisions for such adjustments and also different combinations of tools operating conjointly are within the scope of this invention and of the protection which I claim herein. Figs. 6-12 show certain of such combinations.

In Fig. 6, three spur type tools $a$, $b$ and $c$ are shown in simultaneous mesh with a helical work gear $n$. In Fig. 7, spur type tools $a$ and $b$ and a helical tool $c'$ are shown in mesh with a helical work piece. It will be understood without special illustration that one spur and two helical tools may be used with the same helical work piece.

Likewise all of the tools operating on the same helical work piece may be of helical gear type and either of equal helix angles or different angles. Where the helix angles of the tool teeth are equal and opposite to those of the work gear teeth, the axes of the tools are set parallel to the work spindle axis; and if the tools have teeth of different helix angle than the work piece their axes are set at angles to the work gear axis equal to the difference between the respective helix angles. By way of example, Fig. 8 illustrates a helical tool $b'$ of equal and opposite tooth helix angle to the helical work piece, and tools $a'$ and $c'$ of respectively different helix angles in conjoint action.

Figs. 9, 10, 11 and 12 show different tool combinations adapted to finish spur gears. In Fig. 9 the tools $a'$, $b'$ and $c'$ all have helical teeth of the same helix angle and hand. In Fig. 10, two helical tools $a'$ and $c'$ and a spur type tool $b$ are shown; in Fig. 11, one helical tool $a'$ and two spur tools $b$ and $c$ are shown; and in Fig. 12, three helical tools $a'$, $b'$ and $c'$ of respectively different helix angles organized for simultaneous action with the same spur gear are shown.

When tool and work are meshed with their axes inclined or crossing one another (that is, in a relationship such that each axis intersects a line parallel to the other), and their respective teeth have a difference of helix angle corresponding to the angle at which the axes are crossed, an endwise slip occurs between the mating teeth due to the fact that such teeth travel in planes inclined to each other while in contact. This slip produces a working action of the tool additional to that due to the axial reciprocation of the work and also to that due to the rolling slip. The amount of such slip is proportional to the angle at which the respective axes are crossed (or, in other words, the angles between the respective planes of rotation), and it takes place in one direction or the other according as the axis of the tool is inclined to one or the other side of a perpendicular to the plane in which the work rotates. Hence by arranging different tools at different inclinations to the work, and in some instances at relatively opposite inclinations (of course making them with teeth of appropriate helix angles), the different actions may be performed simultaneously by different tools on the same work piece. This is frequently of advantage in producing a fine surface finish while rapidly bringing the gear teeth to finished dimensions. A combination of tools arranged so that the slip of one is opposite to that of another has the desirable effect of a rapid reciprocating machining action on the work. Fig. 10 illustrates the principle of tools ($a'$ and $c'$) rotating in planes at opposite inclinations to the plane of rotation of the work piece and thereby causing slip in relatively opposite directions at the same time with respect to such tools. It will be understood without further illustration that like results may be obtained on helical gears with tools of appropriate helix angles.

It has already been stated, and may well be repeated at this point, that tools which may be used in the machine combinations here described include shaving tools, both those which have a cutting or scraping action only and those which combine burnishing with cutting; burnishing tools having no cutting function; lapping tools; and grinding wheels or hones; all such tools having teeth similar to gear teeth in outline and in the capacity to be rotated by and transmit rotation to mating gears. They may all be comprehensively designated as master gears.

For the purpose of conveniently defining the invention in the claims, and to furnish an expression generic to both spur type and helical type tools and gears, a spur gear may be considered as a helical gear having zero helix angle; and a spur type tool may be similarly considered and defined.

What I claim and desire to secure by Letters Patent is:

1. A gear finishing machine comprising a supporting structure having a stationary bearing, a work spindle rotatably mounted in said bearing, a series of gear-like tools arranged around the axis of said work spindle to mesh simultaneously with a gear mounted on the spindle at different sides thereof, and means for supporting said tools with provision for adjustment bodily toward and away from the work spindle and also angularly about axes substantially radial thereto.

2. A gear finishing machine comprising means for supporting rotatably a gear to be finished, a series of finishing tools of gear form arranged around the axis of rotation of said work support, means for supporting said tools with a diameter of each in the plane of, and substantially radial to, a work piece mounted in operative position on said work support, and provisions for adjusting said tools angularly about their respective diameters which are radial to the work piece whereby to accommodate the helix angles of the teeth of the tools and work piece to one another.

3. A gear finishing machine comprising a supporting structure, a tool in the form of a master gear, a supporting holder for said tool guided to move rectilinearly in a direction transverse to the axis of said tool and also angularly about the direction of such rectilinear movement, and means for applying fluid pressure to said holder in the direction of such rectilinear movement.

4. In a gear finishing machine, a supporting structure, a stationary housing thereon, a cylinder angularly and axially adjustable in said housing, a piston movable axially in said cylinder, spindle holding means connected to the piston, a tool spindle carried by said holding means with its axis perpendicular to the axis of the cylinder, and a tool in the form of a master gear secured to said spindle.

5. In a gear finishing machine, a plurality of master gear holders surrounding a central point and being mounted with provision for substantially radial movement toward and away from such point, a work spindle located with its axis in such central point and being rotatable about said axis, said spindle having encircling rack teeth, a motor, and transmission gearing from said motor to the spindle including a pinion in mesh with said rack teeth for moving the spindle axially while permitting its free rotation.

6. A gear finishing machine comprising a base, rotatable work supporting means adapted to hold a gear to be finished with its axis coinciding with the axis of rotation of the supporting means, a plurality of tools in the form of gears adapted to mesh with the gear to be finished, tool holders by which said tools are supported rotatably, and means on the base for mounting said tool holders with provision for adjustment bodily toward and away from the axis of the work supporting means and angularly about lines substantially radial to said axis.

7. A gear finishing machine comprising a supporting structure, a work holder rotatably mounted on said supporting structure, a plurality of finishing tools in the form of master gears, holders for said tools mounted on said supporting structure in locations such that the tools are spaced around the axis of rotation of the work supporting means, said tools being mounted rotatably on the tool holders and the holders being adjustable to shift the tools toward and away from said axis and being angularly adjustable to place the tools with their axes parallel to said axis of rotation and at various inclinations to such positions of parallelism.

8. A gear finishing machine comprising a supporting base, guides mounted on said base spaced apart from one another around a central axis, work holding means mounted on the base rotatably with its axis of rotation coinciding with said central axis, tool holders mounted on said guides with provision for displacement in lines substantially radial to said axis, a plurality of finishing tools of gear form held rotatably by said tool holders with a diameter of each substantially radial to said axis and substantially in the plane of rotation of a gear to be finished when the gear is mounted on the work supporting means, the tool holders being angularly adjustable about the said diametral lines of the respective tools for accommodating the helix angles of the tool teeth to the helix angles of the teeth of a work gear.

9. A gear finishing machine comprising a base, a work holding means supported by said base with provision for rotation and for reciprocating movement in the direction of the axis around which it rotates, said work supporting means being adapted to carry spur and helical gears of different helix angles to be finished, tool spindle supports located on different sides of said axis, tool spindles rotatably held by said spindle supports adapted to mount tools in the form of master gears having spur or helical teeth of various helix angles, said spindle supports being located so as to position said tools in simultaneous mesh with a work gear and being adjustable translatively along lines substantially radial to said axis and intersecting the respective tool spindles, and also adjustable angularly about said substantially radial lines.

10. In a gear finishing machine, a supporting structure, means on said supporting structure for mounting a work gear rotatably, a guide on the supporting structure, a slide held by said guide with provision for adjustment endwise toward and away from the axis of rotation of the work piece held by said means, an offset bracket on the end of said slide next to said axis, a tool spindle mounted in said bracket with its axis transverse to the direction of movement of the slide, said bracket being angularly adjustable about a line radial both to the axis of rotation of the work piece and to the axis of the tool spindle, and a gear-like tool mounted on the tool spindle with its end faces embracing said radial line.

11. In a gear finishing machine, a supporting base, means on said base for holding a work gear rotatably and moving it axially, a guide on the base, a sleeve mounted in said guide with provision for movement therein toward and away from the axis of rotation of the work gear and with provision for angular adjustment about the line of such movement, a slide extending through said sleeve and movable endwise therein, a piston connected to said slide fitting within a portion of said sleeve, a bracket on the end of the slide nearer to the work gear location, a tool spindle mounted on said bracket with its axis transverse to and intersecting the axis of angular adjustment of said sleeve, a gear-like finishing tool mounted on said spindle, and means for delivering fluid under pressure against the said piston.

12. In a gear finishing machine, a supporting structure, means on said supporting structure for mounting a work gear rotatably, a guide on the supporting structure, a slide held by said guide with provision for adjustment endwise toward and away from the axis of rotation of the work piece mounted on said means, a bracket on the end of said slide nearest to said axis, a tool spindle mounted in said bracket with its axis transverse to the direction of movement of the slide, said bracket being angularly adjustable about a line radial to both the axis of rotation of the work piece and the axis of the tool spindle, a drive shaft carried by the slide substantially coaxial with said radial line, and a gear train driven by said shaft in driving connection with said tool spindle.

13. In a gear finishing machine, a supporting structure including a stationary housing, a cylinder angularly and axially adjustable in said housing, a piston movable axially in said cylinder, spindle holding means connected to and movable with said piston, a tool spindle carried by said holding means with its axis transverse to the axis of the cylinder, a drive shaft carried by the piston rotatably mounted coaxially with said cylinder, and rotation transmitting means between said drive shaft and tool spindle.

14. In a gear finishing machine, a supporting structure, a work spindle rotatably mounted on said structure, a plurality of cylinders mounted on the supporting structure at different sides of the work spindle with their respective axes transverse and substantially radial to the work spindle axis, said cylinders being adjustable angularly about their respective axes and endwise toward and away from the spindle axis, and tool spindles supported by the respective cylinders each with its axis transverse to the axis of the cylinder by which it is supported, whereby the tool spindles may be placed at various distances from the work spindle axis and inclined in varying degrees to such axis.

15. In a gear finishing machine, a supporting structure, a work spindle rotatably mounted on said structure, a plurality of cylinders mounted on the supporting structure at different sides of the work spindle with their respective axes transverse and substantially radial to the work spindle axis, said cylinders being adjustable angularly about their respective axes and endwise toward and away from the spindle axis, pistons mounted in the respective cylinders for axial reciprocation therein, tool spindles supported and carried by the respective pistons with their axes transverse to the axis of the cylinder, in positions enabling them to be placed at various inclinations to, and distances from, the work spindle axis by adjustment of the respective cylinders, and means for applying force to the respective pistons in directions for forcing the tool spindles toward the work spindle axis.

16. In a gear finishing machine, a supporting structure, a work spindle rotatably mounted on said structure, a plurality of cylinders mounted on the supporting structure at different sides of the work spindle with their respective axes transverse and substantially radial to the work spindle axis, said cylinders being adjustable angularly about their respective axes and endwise toward and away from the spindle axis, a drive shaft rotatably mounted coaxially in one of said cylinders and rotation transmitting means between said shaft and the tool spindle which is supported by the same cylinder.

17. A gear finishing machine comprising a supporting structure including a rotatable work support, a series of finishing tools of gear form surrounding the axis of said work support and adapted to mesh simultaneously with a gear mounted thereon, holders for the respective finishing tools all movable toward and away from said axis, means organized to exert force on all of said holders in directions to press the finishing tools toward the said axis, and means for applying torque to one of said tools, whereby to rotate the work gear and other tools by tooth-transmitted motion.

EDWARD W. MILLER.